(12) United States Patent
Yin et al.

(10) Patent No.: US 12,504,115 B2
(45) Date of Patent: Dec. 23, 2025

(54) EASY-TO-ASSEMBLE TELESCOPIC LEG TUBE STRUCTURE OF SUPPORT FRAME AND SUPPORT FRAME

(71) Applicant: Fotopro (Guangdong) Image Industrial Co., Ltd, Guangdong (CN)

(72) Inventors: Huibin Yin, Guangdong (CN); Xinglong Xie, Guangdong (CN)

(73) Assignee: Fotopro (Guangdong) Image Industrial Co., Ltd, Zhongshan (CN)

(*) Notice: Subject to any disclaimer, the term of this patent is extended or adjusted under 35 U.S.C. 154(b) by 63 days.

(21) Appl. No.: 18/742,804

(22) Filed: Jun. 13, 2024

(65) Prior Publication Data

US 2025/0314348 A1    Oct. 9, 2025

(30) Foreign Application Priority Data

Apr. 8, 2024   (CN) .......................... 202420711925.6

(51) Int. Cl.
*F16M 11/28* (2006.01)
*G03B 17/56* (2021.01)

(52) U.S. Cl.
CPC ........... *F16M 11/28* (2013.01); *G03B 17/561* (2013.01); *F16M 2200/025* (2013.01)

(58) Field of Classification Search
CPC .. F16M 11/28; F16M 2200/025; F16M 11/26; G03B 17/561; F16B 7/10
USPC ....................................... 248/188.5; 403/104
See application file for complete search history.

(56) References Cited

U.S. PATENT DOCUMENTS

| | | | | |
|---|---|---|---|---|
| 4,029,279 A | * | 6/1977 | Nakatani ............... | F16B 7/1454 403/109.5 |
| 4,105,346 A | * | 8/1978 | Gelinas ................. | F16B 7/1427 403/104 |
| 4,185,936 A | * | 1/1980 | Takahashi ............. | F16B 7/1454 248/188.5 |
| 4,596,484 A | * | 6/1986 | Nakatani ............... | F16M 11/28 403/109.5 |
| 4,761,092 A | * | 8/1988 | Nakatani ............ | F16M 11/2021 403/109.5 |
| 4,932,622 A | * | 6/1990 | Hayakawa ............. | F16M 11/32 248/188.5 |
| 5,364,163 A | * | 11/1994 | Hardison ................. | A47C 3/18 297/344.21 |
| 6,461,074 B2 | * | 10/2002 | Taylor .................... | F16B 7/105 403/109.1 |

(Continued)

*Primary Examiner* — Muhammad Ijaz

(57) ABSTRACT

Provided are an easy-to-assemble telescopic leg tube structure of a support frame and a support frame. The telescopic leg tube structure includes a first telescopic rod, a second telescopic rod, a limiting piece assembly, a sliding stop piece assembly, and a snap-in piece. A telescopic rod through hole is formed in a sidewall of the first telescopic rod; a limiting piece locking hole communicating with the telescopic rod through hole is formed in a sidewall of the limiting piece assembly; the snap-in piece is removably inserted into the telescopic rod through hole and the limiting piece locking hole to prevent the limiting piece assembly from being disengaged from the first telescopic rod along a direction in which the second telescopic rod telescopically moves relative to the first telescopic rod; and the limiting piece assembly is disengaged from the first telescopic rod when the snap-in piece is pulled out.

18 Claims, 4 Drawing Sheets

(56) References Cited

U.S. PATENT DOCUMENTS

| | | | |
|---|---|---|---|
| 6,536,723 B1* | 3/2003 | Nakatani | F16M 11/36 |
| | | | 248/163.1 |
| 6,854,697 B2* | 2/2005 | Akaike | F16M 11/32 |
| | | | 248/407 |
| 12,416,850 B1* | 9/2025 | Jankura | F16M 11/32 |
| 2002/0030146 A1* | 3/2002 | Akaike | F16M 11/32 |
| | | | 248/188.5 |
| 2011/0284704 A1* | 11/2011 | Pryor | G05G 5/06 |
| | | | 248/188.5 |
| 2016/0102693 A1* | 4/2016 | Wang | F16M 11/28 |
| | | | 248/161 |
| 2023/0304629 A1* | 9/2023 | Montesin | F16M 11/28 |
| 2025/0224655 A1* | 7/2025 | Li | F16M 13/04 |

\* cited by examiner

EASY-TO-ASSEMBLE TELESCOPIC LEG
TUBE STRUCTURE OF SUPPORT FRAME
AND SUPPORT FRAME

TECHNICAL FIELD

The present disclosure relates to the field of photographic equipment, and in particular, to an easy-to-assemble telescopic leg tube structure of a support frame and a support frame.

BACKGROUND

Support frames are equipment for supporting and adjusting photographic apparatuses in photographic activities. Existing support frames each usually have a multi-stage telescopic structure. However, due to an unreasonable design of a connecting structure between a front stage and a rear stage of these support frames, the multi-stage telescopic structure of the support frame can only be disassembled stage by stage from top to bottom, and cannot be disassembled stage by stage from bottom to top. When a last stage telescopic rod needs to be disassembled due to a failure, etc., the entire supporting leg needs to be disassembled so that the last stage telescopic rod can be taken out for repair, which causes great inconvenience.

In order to solve the above problem, an existing support frame, e.g., a supporting leg with a multi-stage telescopic assembly is disclosed in patent No. CN2022234201742 (a telescopic supporting leg and a supporting frame). The telescopic assembly includes a telescopic rod, a locking device, a first limiting device, and a second limiting device. In addition, the patent further discloses specific structures of the first limiting device and the second limiting device. The supporting leg can be separated from top to bottom or from bottom to top, and the telescopic rod of each stage can be detached independently. The supporting leg is greatly improved in use flexibility, and the maintenance is convenient. However, such a supporting leg structure is too complicated, and especially, the manufacturing process of the structure of each limiting device is cumbersome and the assembly is complex. Moreover, the production cost is high, which is adverse to large-scale promotion.

Therefore, there is an urgent need for an easy-to-assemble telescopic leg tube structure of a support frame and a support frame to solve the above problems.

SUMMARY

The present disclosure aims to solve at least one of the technical problems existing in the prior art. For this purpose, the present disclosure provides an easy-to-assemble telescopic leg tube structure of a support frame and a support frame.

The technical solution adopted to solve the technical problems in an embodiment of the present disclosure is as follows: an easy-to-assemble telescopic leg tube structure of a support frame includes: a first telescopic rod; a second telescopic rod movably disposed inside the first telescopic rod; a limiting piece assembly defined on an inner wall of the first telescopic rod; a sliding stop piece assembly defined on an outer wall of the second telescopic rod to follow a movement of the second telescopic rod relative to the first telescopic rod, where the limiting piece assembly on the first telescopic rod is capable of abutting against the sliding stop piece assembly on the second telescopic rod to prevent the first telescopic rod from being disengaged from the second telescopic rod; and
a snap-in piece,
where a telescopic rod through hole is formed in a sidewall of the first telescopic rod;
a limiting piece locking hole communicating with the telescopic rod through hole is formed in a sidewall of the limiting piece assembly;
the snap-in piece is removably inserted into the telescopic rod through hole and the limiting piece locking hole to prevent the limiting piece assembly from being disengaged from the first telescopic rod along a direction in which the second telescopic rod telescopically moves relative to the first telescopic rod; and
the limiting piece assembly is allowed to be disengaged from the first telescopic rod when the snap-in piece is pulled out.

In one of preferred embodiments of the present disclosure, the easy-to-assemble telescopic leg tube structure of a support frame further includes a locking assembly removably sleeved outside the first telescopic rod, where the locking assembly is switched between a locked state and an unlocked state to selectively prevent or allow a telescopic movement of the first telescopic rod relative to the second telescopic rod; and
the snap-in piece is locked by the locking assembly;
where the snap-in piece is locked by the locking assembly when the locking assembly is sleeved outside the first telescopic rod, to prevent the snap-in piece from being pulled out of the telescopic rod through hole and the limiting piece locking hole; and
the snap-in piece is unlocked when the locking assembly is detached from the first telescopic rod, to allow the snap-in piece to be pulled out of the telescopic rod through hole and the limiting piece locking hole.

In one of preferred embodiments of the present disclosure, the locking assembly includes a hoop sleeved outside the first telescopic rod;
a hoop through hole communicating with the telescopic rod through hole is formed in a sidewall of the hoop;
the hoop through hole penetrates through the sidewall of the hoop;
the telescopic rod through hole penetrates through the sidewall of the first telescopic rod; and
the snap-in piece is simultaneously inserted into the hoop through hole, the telescopic rod through hole, and the limiting piece locking hole.

In one of preferred embodiments of the present disclosure, the snap-in piece is in an inverted T shape and includes a large-diameter segment and a small-diameter segment; a stepped surface is formed at an intersection of the large-diameter segment and the small-diameter segment;
the large-diameter segment is inserted into the telescopic rod through hole and the limiting piece locking hole;
the small-diameter segment is inserted into the hoop through hole; and
a diameter of the hoop through hole is smaller than a maximum outer diameter of the large-diameter segment so as to prevent the large-diameter segment from passing through the hoop through hole.

In one of preferred embodiments of the present disclosure, the limiting piece locking hole penetrates through the sidewall of the limiting piece assembly; and
the snap-in piece inserted into the telescopic rod through hole and the limiting piece locking hole is supported on a sidewall of the second telescopic rod.

In one of preferred embodiments of the present disclosure, a first straight slot and a second straight slot communicating with the first straight slot are formed in the sidewall of the first telescopic rod; the first straight slot axially penetrates and extends through an end of the first telescopic rod along a telescoping direction, and the second straight slot axially penetrates and extends along a circumferential direction of the first telescopic rod;

the sliding stop piece assembly includes a first sliding stop piece and a second sliding stop piece; the first sliding stop piece and the second sliding stop piece are connected to the outer wall of the second telescopic rod through a positioning structure;

the positioning structure includes a positioning hole formed in the second telescopic rod and a positioning block disposed on the first sliding stop piece and the second sliding stop piece; and the positioning block is inserted into the positioning hole.

In one of preferred embodiments of the present disclosure, a first abutting portion abutting against the limiting piece assembly is disposed on the locking assembly.

In one of preferred embodiments of the present disclosure, external contours of cross sections of the first telescopic rod and the second telescopic rod are non-circular.

In one of preferred embodiments of the present disclosure, the snap-in piece and the locking assembly are molded integrally.

A support frame includes the telescopic leg tube structure.

The present disclosure has the following beneficial effects: an easy-to-assemble telescopic leg tube structure of a support frame and a support frame are provided. The telescopic leg tube structure includes: a first telescopic rod; a second telescopic rod movably disposed inside the first telescopic rod; a limiting piece assembly defined on an inner wall of the first telescopic rod; a sliding stop piece assembly defined on an outer wall of the second telescopic rod to follow a movement of the second telescopic rod relative to the first telescopic rod, where the limiting piece assembly on the first telescopic rod is capable of abutting against the sliding stop piece assembly on the second telescopic rod to prevent the first telescopic rod from being disengaged from the second telescopic rod; and a snap-in piece, where a telescopic rod through hole is formed in a sidewall of the first telescopic rod; a limiting piece locking hole communicating with the telescopic rod through hole is formed in a sidewall of the limiting piece assembly; the snap-in piece is removably inserted into the telescopic rod through hole and the limiting piece locking hole to prevent the limiting piece assembly from being disengaged from the first telescopic rod along a direction in which the second telescopic rod telescopically moves relative to the first telescopic rod; and the limiting piece assembly is allowed to be disengaged from the first telescopic rod when the snap-in piece is pulled out. With such a structure, a movement between the telescopic rods can be limited, and the telescopic rod of each stage can be assembled and disassembled independently. The convenience of maintenance is greatly improved. The telescopic leg tube structure has excellent practicability.

BRIEF DESCRIPTION OF THE DRAWINGS

The above and/or additional aspects and advantages of the present disclosure will become apparent and readily comprehensible from the description of embodiments in conjunction with the following accompanying drawings.

DETAILED DESCRIPTION OF THE EMBODIMENTS

A specific embodiment of the present disclosure will be described in detail below. A preferred embodiment of the present disclosure is illustrated in the accompanying drawings. The accompanying drawings serve to supplement the text description herein with figures, providing a visual understanding of each technical feature and the overall technical solution of the present disclosure, but cannot be construed as a limitation to the protection scope of the present disclosure.

In the description of the present disclosure, "a plurality of" means two or more; and the terms such as "greater than", "less than", and "more than" are construed as exclusive of the numerical value stated, and the terms such as "above", "below", and "within" are construed as inclusive of the numerical value stated. The "first" and "second" in the description are merely intended to distinguish technical features, rather than to indicate or imply relative importance or implicitly indicate a number of the indicated technical features or implicitly indicate a sequence relationship of the indicated technical features.

In the description of the present disclosure, it should be understood that orientation or position relationships indicated by terms "upper", "lower", "front", "rear", "left", "right", etc. are orientation or position relationships shown in the accompanying drawings, and these terms are just used to facilitate description of the present disclosure and simplify the description, but not to indicate or imply that the mentioned device or element must have a specific orientation and must be constructed and operated in a specific orientation, and thus cannot be construed as a limitation to the present disclosure.

In the present disclosure, unless otherwise explicitly specified, the terms such as "arrange", "mount" and "connect" should be broadly understood. For example, they may be a direct connection, or an indirect connection by means of an intermediate medium; may be a fixed connection, a detachable connection or integral molding; may be a mechanical connection; or may be internal communication between two elements or an interactive relationship between two elements. Those skilled in the art may reasonably determine the specific meanings of the above terms in the present disclosure according to the specific contents of the technical solution.

Figure 1:
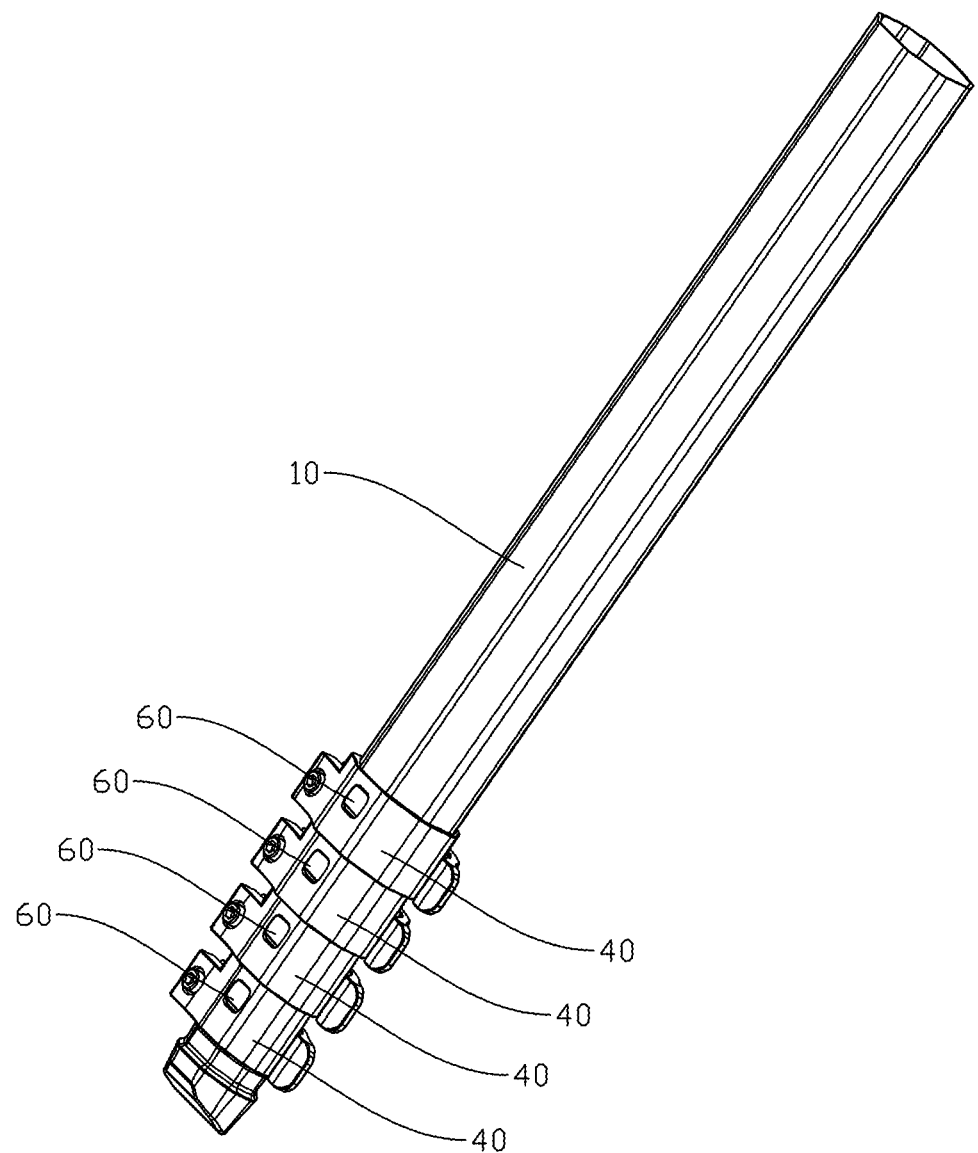
FIG. 1 is a structural schematic diagram of an easy-to-assemble telescopic leg tube structure of a support frame in a folded state.
Figure 2:
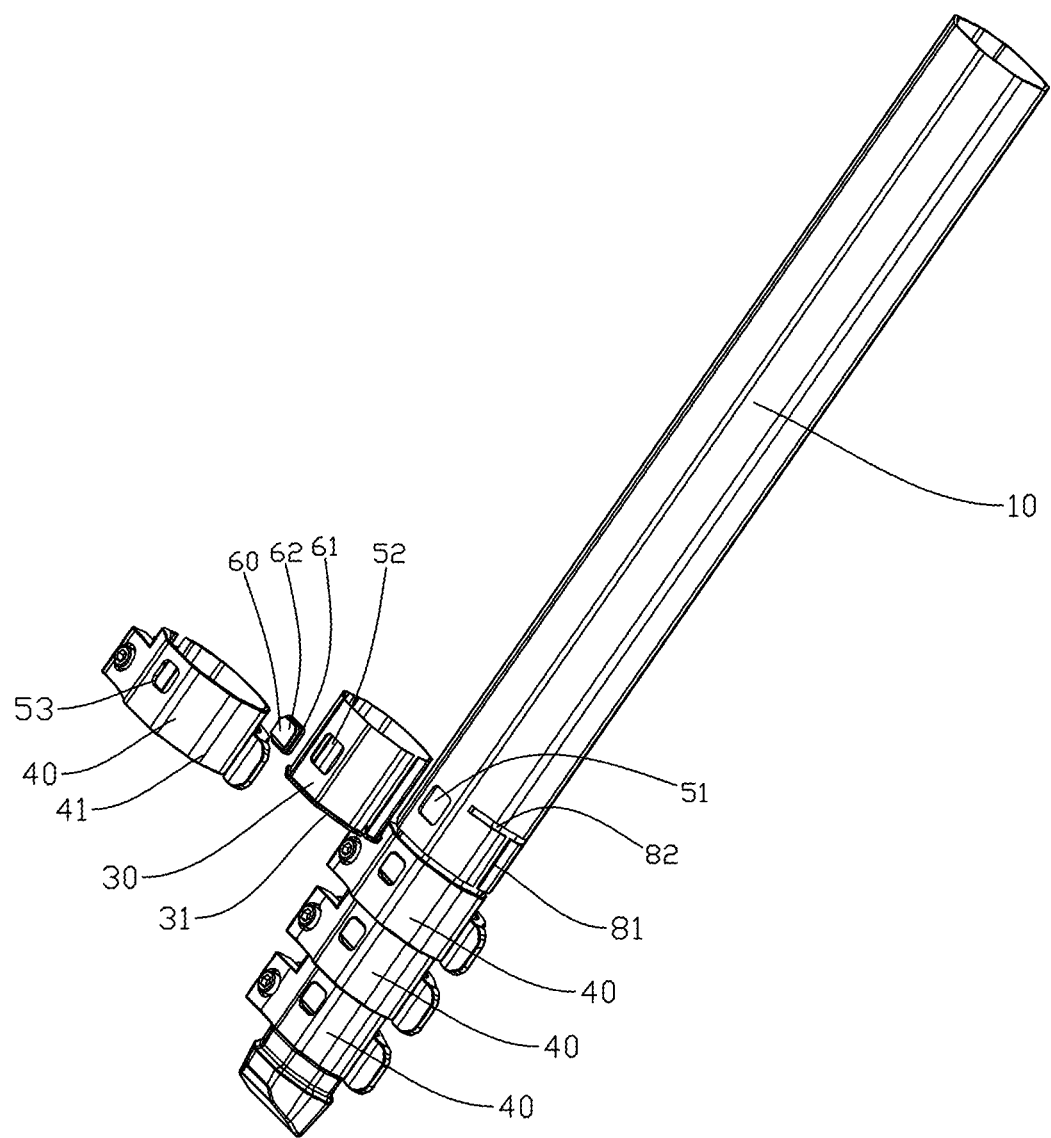
FIG. 2 is an exploded view of an easy-to-assemble telescopic leg tube structure of a support frame in an unfolded state.
Figure 3:
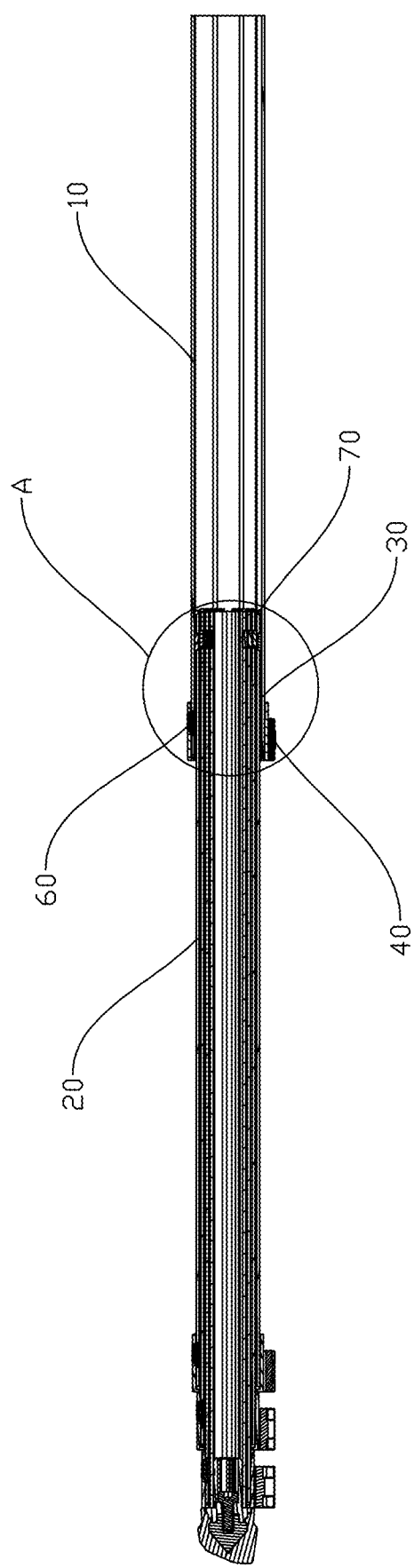
FIG. 3 is a cross-sectional view of an easy-to-assemble telescopic leg tube structure of a support frame in an unfolded state.
Figure 4:
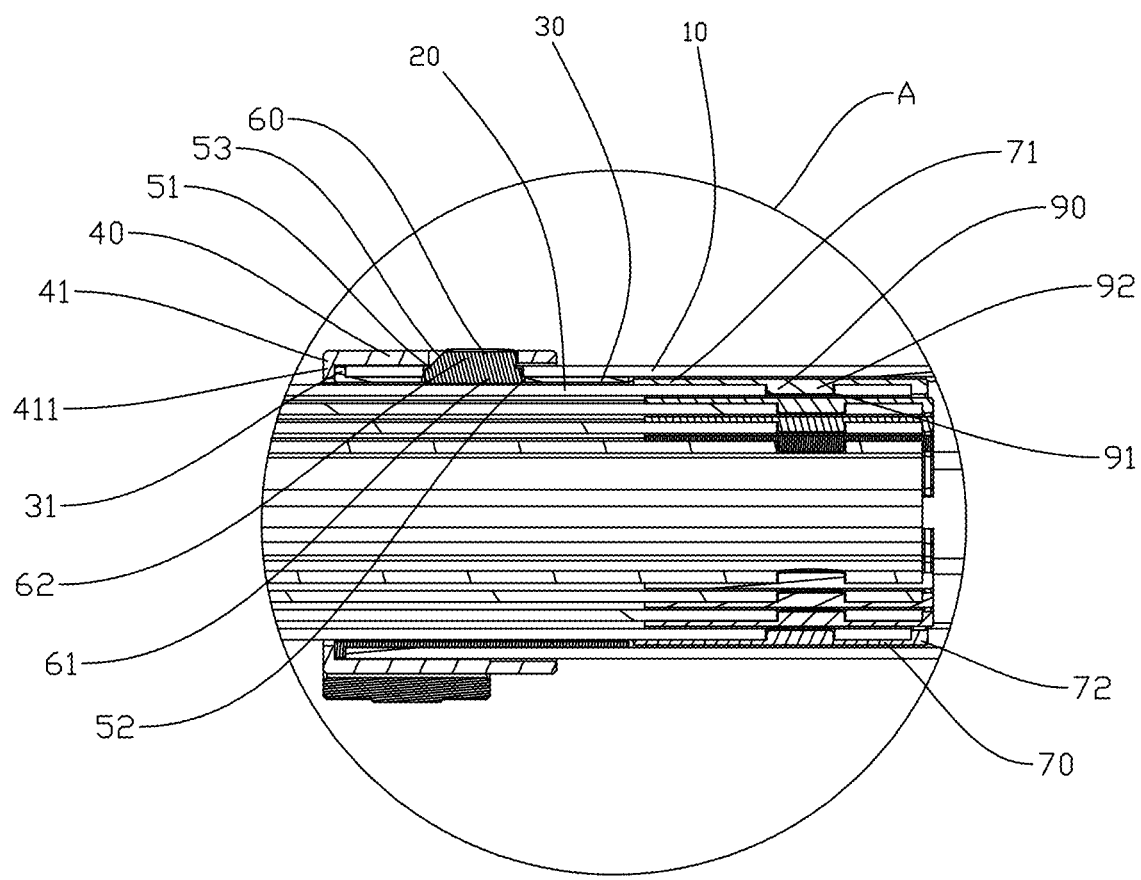
FIG. 4 is a partial enlarged view of area A in FIG. 3.

With reference to FIG. 1 to FIG. 4, an easy-to-assemble telescopic leg tube structure of a support frame includes a first telescopic rod 10; a second telescopic rod 20 movably disposed inside the first telescopic rod 10; a limiting piece assembly 30 defined on an inner wall of the first telescopic rod 10; a sliding stop piece assembly 70 defined on an outer wall of the second telescopic rod 20 to follow a movement of the second telescopic rod 20 relative to the first telescopic rod 10, where the limiting piece assembly 30 on the first telescopic rod 10 is capable of abutting against the sliding stop piece assembly 70 on the second telescopic rod 20 to prevent the first telescopic rod 10 from being disengaged from the second telescopic rod 20; and a snap-in piece 60,
where a telescopic rod through hole 51 is formed in a sidewall of the first telescopic rod 10;
a limiting piece locking hole 52 communicating with the telescopic rod through hole 51 is formed in a sidewall of the limiting piece assembly 30;
the snap-in piece 60 is removably inserted into the telescopic rod through hole 51 and the limiting piece locking hole 52 to prevent the limiting piece assembly 30 from being disengaged from the first telescopic rod 10 along a direction in which the second telescopic rod 20 telescopically moves relative to the first telescopic rod 10; and
the limiting piece assembly 30 is allowed to be disengaged from the first telescopic rod 10 when the snap-in piece 60 is pulled out.

(1) In the present disclosure, during assembling, the first sliding stop piece 71 and the second sliding stop piece 72 are separately mounted on the outer wall of the second telescopic rod 20. The limiting piece assembly 30 includes a first limiting piece and a second limiting piece. The first limiting piece and the second limiting piece are mounted on inner walls of two sides of the first telescopic rod 10, respectively, and a second abutting portion 31 on the first limiting piece and the second limiting piece is abutted against an end of the first telescopic rod 10. The second telescopic rod 20 with the sliding stop pieces is inserted into the first telescopic rod 10 such that the first limiting piece and the second limiting piece are located between the first telescopic rod 10 and the second telescopic rod 20, and such that a hoop through hole 53, the telescopic rod through hole 51, and the limiting piece locking hole 52 are arranged oppositely. The snap-in piece 60 is then placed into the telescopic rod through hole 51 and the limiting piece locking hole 52. Specifically, a large-diameter segment 61 of the snap-in piece 60 is inserted into the telescopic rod through hole 51 and the limiting piece locking hole 52, while a small-diameter segment 62 of the snap-in piece 60 is inserted into the hoop through hole 53. A diameter of the hoop through hole 53 is smaller than a maximum outer diameter of the large-diameter segment 61 so as to prevent the large-diameter segment 61 from passing through the hoop through hole 53. Finally, the locking assembly 40 is locked on the first telescopic rod 10 such that a first abutting portion 411 on the locking assembly 40 is abutted against the second abutting portion 31. When a telescopic assembly are unfolded, the second telescopic rod 20 is unfolded relative to the first telescopic rod 10, which in turn drives the sliding stop piece assembly 70 to move until the sliding stop piece assembly 70 is abutted against the end of the limiting piece assembly 30 facing away from the second abutting portion 31, thereby limiting the movement of the second telescopic rod 20 and reaching a maximum unfolding travel distance. The first telescopic rod 10 in the telescopic assembly of a current stage may act as the second telescopic rod 20 in the telescopic assembly of a previous stage, and the second telescopic rod 20 in the telescopic assembly of the current stage may act as the first telescopic rod 10 in the telescopic assembly of next stage. Thus, cascading of multiple stages of telescopic assemblies is realized.

(2) During disassembling, the locking assembly 40 is firstly converted to an unlocked state, and the locking assembly 40 is detached from the snap-in piece 60 to release the limitation on the snap-in piece 60. The snap-in piece 60 is then pulled out of the telescopic rod through hole 51 and the limiting piece locking hole 52, and at this time, the limiting piece assembly 30 can be separated from the first telescopic rod 10. When the second telescopic rod 20 is pulled, the sliding stop piece assembly 70 may be driven to move together. Since the limiting piece assembly 30 at this time does not limit the movement of the sliding stop piece assembly 70, the second telescopic rod 20 and the sliding stop piece assembly 70 will be caused to be together disengaged from the first telescopic rod 10, thereby realizing the disassembling of the second telescopic rod 20. The disassembling processes of other telescopic assemblies are consistent with the process described above and will not be described redundantly here. It needs to be noted that: in a first embodiment of the snap-in piece 60, there is no hoop through hole 53 formed in the locking assembly 40, and the locking assembly 40 covers the snap-in piece 60 placed into the telescopic rod through hole 51 and the limiting piece locking hole 52. In a second embodiment of the snap-in piece 60, the hoop through hole 53 is formed in the locking assembly 40; the snap-in piece 60 and the locking assembly 40 are of a split structure, and the snap-in piece 60 is disposed in the hoop through hole 53, the telescopic rod through hole 51, and the limiting piece locking hole 52; and the hoop through hole 53 may penetrate through or not penetrate through the locking assembly. In a third embodiment of the snap-in piece 60, the snap-in piece 60 is molded integrally with the locking assembly 40, and extends into the telescopic rod through hole 51 and the limiting piece locking hole 52 when the locking assembly 40 is sleeved on the first telescopic rod 10.

(3) The present disclosure has the following advantages: With such a structure, a movement between the telescopic rods can be limited, and the telescopic rod of each stage can be assembled and disassembled independently. The convenience of maintenance is greatly improved. The telescopic leg tube structure has excellent practicability.

Preferably, the easy-to-assemble telescopic leg tube structure of a support frame further includes a locking assembly 40 removably sleeved outside the first telescopic rod 10, where the locking assembly 40 is switched between a locked state and an unlocked state to selectively prevent or allow a telescopic movement of the first telescopic rod 10 relative to the second telescopic rod 20; and the snap-in piece 60 is locked by the locking assembly 40;
where the snap-in piece 60 is locked by the locking assembly 40 when the locking assembly 40 is sleeved outside the first telescopic rod 10, to prevent the snap-in piece 60 from being pulled out of the telescopic rod through hole 51 and the limiting piece locking hole 52; and
the snap-in piece 60 is unlocked when the locking assembly 40 is detached from the first telescopic rod 10, to allow the snap-in piece 60 to be pulled out of the telescopic rod through hole 51 and the limiting piece locking hole 52.

In a preferred embodiment of the locking assembly 40, the locking assembly 40 includes a hoop 41 sleeved outside the first telescopic rod 10;

a hoop through hole 53 communicating with the telescopic rod through hole 51 is formed in a sidewall of the hoop 41;
the hoop through hole 53 penetrates through the sidewall of the hoop 41;
the telescopic rod through hole 51 penetrates through the sidewall of the first telescopic rod 10; and the snap-in piece 60 is simultaneously inserted into the hoop through hole 53, the telescopic rod through hole 51, and the limiting piece locking hole 52. With the snap-in piece 60, the locking assembly 40 in the unlocked state can be prevented from being disengaged from the first telescopic rod 10 along the direction in which the second telescopic rod 20 telescopically moves relative to the first telescopic rod 10.

In one of preferred embodiments of the present disclosure, the snap-in piece 60 is in an inverted T shape and includes a large-diameter segment 61 and a small-diameter segment 62; a stepped surface is formed at an intersection of the large-diameter segment 61 and the small-diameter segment 62;

the large-diameter segment 61 is inserted into the telescopic rod through hole 51 and the limiting piece locking hole 52;

the small-diameter segment 62 is inserted into the hoop through hole 53; and a diameter of the hoop through hole 53 is smaller than a maximum outer diameter of the large-diameter segment 61 so as to prevent the large-diameter segment 61 from passing through the hoop through hole 53. In this way, the hoop 41 is caused to lock the snap-in piece 60, and the snap-in piece 60 can be allowed to be pulled out of the telescopic rod through hole 51 and the limiting piece locking hole 52 only after the hoop 41 is removed.

In one of preferred embodiments of the present disclosure, the limiting piece locking hole 52 penetrates through the sidewall of the limiting piece assembly 30; and the snap-in piece 60 inserted into the telescopic rod through hole 51 and the limiting piece locking hole 52 is supported on a sidewall of the second telescopic rod 20.

In a further embodiment of the locking assembly 40, a first abutting portion 411 abutting against the limiting piece assembly 30 is disposed on the locking assembly 40 to limit the limiting piece assembly 30 from being disengaged from the inner wall of the first telescopic rod 10.

Preferably, a first straight slot 81 and a second straight slot 82 communicating with the first straight slot 81 are formed in the sidewall of the first telescopic rod 10; the first straight slot 81 axially penetrates and extends through an end of the first telescopic rod 10 along a telescoping direction, and the second straight slot 82 axially penetrates and extends along a circumferential direction of the first telescopic rod 10. The first straight slot 81 and the second straight slot 82 are formed in the sidewall of the first telescopic rod 10 so that the first telescopic rod 10 can be deformed to a certain extent during the assembling process, and the locking assembly 40 can be locked onto the outer wall of the first telescopic rod 10 conveniently.

Preferably, external contours of cross sections of the first telescopic rod 10 and the second telescopic rod 20 are non-circular. A relative rotation between the first telescopic rod 10 and the second telescopic rod 20 can be avoided.

In a preferred embodiment of the sliding stop piece assembly 70, the sliding stop piece assembly 70 includes a first sliding stop piece 71 and a second sliding stop piece 72. The first sliding stop piece 71 and the second sliding stop piece 72 are connected to the outer wall of the second telescopic rod 20 through a positioning structure 90.

In a preferred embodiment of the positioning structure 90, the positioning structure 90 includes a positioning hole 91 formed in the second telescopic rod 20 and a positioning block 92 disposed on the first sliding stop piece 71 and the second sliding stop piece 72. The positioning block 92 is inserted into the positioning hole 91.

In a preferred embodiment of the locking assembly 40, the locking assembly 40 is disposed as a buckle.

A support frame includes the telescopic leg tube structure.

Certainly, the present disclosure is not limited to the above implementation. Equivalent transformations and replacements may be made by those skilled in the art without departing from the spirit of the present disclosure, and shall fall within the scope defined by the claims of the present application.

What is claimed is:

1. An easy-to-assemble telescopic leg tube structure of a support frame, comprising: a first telescopic rod (10); a second telescopic rod (20) movably disposed inside the first telescopic rod (10); a limiting piece assembly (30) defined on an inner wall of the first telescopic rod (10); and a sliding stop piece assembly (70) defined on an outer wall of the second telescopic rod (20) to follow a movement of the second telescopic rod (20) relative to the first telescopic rod (10), wherein the limiting piece assembly (30) on the first telescopic rod (10) is capable of abutting against the sliding stop piece assembly (70) on the second telescopic rod (20) to prevent the first telescopic rod (10) from being disengaged from the second telescopic rod (20); and the easy-to-assemble telescopic leg tube structure of a support frame further comprises a snap-in piece (60), wherein a telescopic rod through hole (51) is formed in a sidewall of the first telescopic rod (10);

a limiting piece locking hole (52) communicating with the telescopic rod through hole (51) is formed in a sidewall of the limiting piece assembly (30);

the snap-in piece (60) is removably inserted into the telescopic rod through hole (51) and the limiting piece locking hole (52) to prevent the limiting piece assembly (30) from being disengaged from the first telescopic rod (10) along a direction in which the second telescopic rod (20) telescopically moves relative to the first telescopic rod (10); and the limiting piece assembly (30) is allowed to be disengaged from the first telescopic rod (10) when the snap-in piece (60) is pulled out.

2. The easy-to-assemble telescopic leg tube structure of a support frame according to claim 1, further comprising:

a locking assembly (40) removably sleeved outside the first telescopic rod (10), wherein the locking assembly (40) is switched between a locked state and an unlocked state to selectively prevent or allow a telescopic movement of the first telescopic rod (10) relative to the second telescopic rod (20); and the snap-in piece (60) is locked by the locking assembly (40);

wherein the snap-in piece (60) is locked by the locking assembly (40) when the locking assembly (40) is sleeved outside the first telescopic rod (10), to prevent the snap-in piece (60) from being pulled out of the telescopic rod through hole (51) and the limiting piece locking hole (52); and the snap-in piece (60) is unlocked when the locking assembly (40) is detached from the first telescopic rod (10), to allow the snap-in piece (60) to be pulled out of the telescopic rod through hole (51) and the limiting piece locking hole (52).

3. The easy-to-assemble telescopic leg tube structure of a support frame according to claim 2, wherein:

the locking assembly (40) comprises a hoop (41) sleeved outside the first telescopic rod (10);

a hoop through hole (53) communicating with the telescopic rod through hole (51) is formed in a sidewall of the hoop (41);

the hoop through hole (53) penetrates through the sidewall of the hoop (41);

the telescopic rod through hole (51) penetrates through the sidewall of the first telescopic rod (10); and the snap-in piece (60) is simultaneously inserted into the hoop through hole (53), the telescopic rod through hole (51), and the limiting piece locking hole (52).

4. The easy-to-assemble telescopic leg tube structure of a support frame according to claim 3, wherein:

the snap-in piece (60) is in an inverted T shape and comprises a large-diameter segment (61) and a small-diameter segment (62); a stepped surface is formed at an intersection of the large-diameter segment (61) and the small-diameter segment (62);

the large-diameter segment (61) is inserted into the telescopic rod through hole (51) and the limiting piece locking hole (52);

the small-diameter segment (62) is inserted into the hoop through hole (53); and a diameter of the hoop through hole (53) is smaller than a maximum outer diameter of the large-diameter segment (61) so as to prevent the large-diameter segment (61) from passing through the hoop through hole (53).

5. The easy-to-assemble telescopic leg tube structure of a support frame according to claim 4, wherein:

the limiting piece locking hole (52) penetrates through the sidewall of the limiting piece assembly (30); and the snap-in piece (60) inserted into the telescopic rod through hole (51) and the limiting piece locking hole (52) is supported on a sidewall of the second telescopic rod (20).

6. The easy-to-assemble telescopic leg tube structure of a support frame according to claim 4, wherein a first straight slot (81) and a second straight slot (82) communicating with the first straight slot (81) are formed in the sidewall of the first telescopic rod (10); the first straight slot (81) axially penetrates and extends through an end of the first telescopic rod (10) along a telescoping direction, and the second straight slot (82) axially penetrates and extends along a circumferential direction of the first telescopic rod (10);

the sliding stop piece assembly (70) comprises a first sliding stop piece (71) and a second sliding stop piece (72); the first sliding stop piece (71) and the second sliding stop piece (72) are connected to the outer wall of the second telescopic rod (20) through a positioning structure (90); and the positioning structure (90) comprises a positioning hole (91) formed in the second telescopic rod (20) and a positioning block (92) disposed on the first sliding stop piece (71) and the second sliding stop piece (72); and the positioning block (92) is inserted into the positioning hole (91).

7. The easy-to-assemble telescopic leg tube structure of a support frame according to claim 4, wherein a first abutting portion (411) abutting against the limiting piece assembly (30) is disposed on the locking assembly (40).

8. The easy-to-assemble telescopic leg tube structure of a support frame according to claim 4, wherein external contours of cross sections of the first telescopic rod (10) and the second telescopic rod (20) are non-circular.

9. The easy-to-assemble telescopic leg tube structure of a support frame according to claim 4, wherein the snap-in piece (60) and the locking assembly (40) are molded integrally.

10. A support frame, comprising the easy-to-assemble telescopic leg tube structure according to claim 1.

11. The support frame according to claim 10, wherein the easy-to-assemble telescopic leg tube structure further comprises:

a locking assembly (40) removably sleeved outside the first telescopic rod (10), wherein the locking assembly (40) is switched between a locked state and an unlocked state to selectively prevent or allow a telescopic movement of the first telescopic rod (10) relative to the second telescopic rod (20); and the snap-in piece (60) is locked by the locking assembly (40);

wherein the snap-in piece (60) is locked by the locking assembly (40) when the locking assembly (40) is sleeved outside the first telescopic rod (10), to prevent the snap-in piece (60) from being pulled out of the telescopic rod through hole (51) and the limiting piece locking hole (52); and the snap-in piece (60) is unlocked when the locking assembly (40) is detached from the first telescopic rod (10), to allow the snap-in piece (60) to be pulled out of the telescopic rod through hole (51) and the limiting piece locking hole (52).

12. The support frame according to claim 11, wherein:

the locking assembly (40) comprises a hoop (41) sleeved outside the first telescopic rod (10);

a hoop through hole (53) communicating with the telescopic rod through hole (51) is formed in a sidewall of the hoop (41);

the hoop through hole (53) penetrates through the sidewall of the hoop (41);

the telescopic rod through hole (51) penetrates through the sidewall of the first telescopic rod (10); and the snap-in piece (60) is simultaneously inserted into the hoop through hole (53), the telescopic rod through hole (51), and the limiting piece locking hole (52).

13. The support frame according to claim 12, wherein:

the snap-in piece (60) is in an inverted T shape and comprises a large-diameter segment (61) and a small-diameter segment (62); a stepped surface is formed at an intersection of the large-diameter segment (61) and the small-diameter segment (62);

the large-diameter segment (61) is inserted into the telescopic rod through hole (51) and the limiting piece locking hole (52);

the small-diameter segment (62) is inserted into the hoop through hole (53); and a diameter of the hoop through hole (53) is smaller than a maximum outer diameter of the large-diameter segment (61) so as to prevent the large-diameter segment (61) from passing through the hoop through hole (53).

14. The support frame according to claim 13, wherein:

the limiting piece locking hole (52) penetrates through the sidewall of the limiting piece assembly (30); and the snap-in piece (60) inserted into the telescopic rod through hole (51) and the limiting piece locking hole (52) is supported on a sidewall of the second telescopic rod (20).

15. The support frame according to claim 14, wherein a first straight slot (81) and a second straight slot (82) communicating with the first straight slot (81) are formed in the sidewall of the first telescopic rod (10); the first straight slot (81) axially penetrates and extends through an end of the first telescopic rod (10) along a telescoping direction, and the second straight slot (82) axially penetrates and extends along a circumferential direction of the first telescopic rod (10);

the sliding stop piece assembly (70) comprises a first sliding stop piece (71) and a second sliding stop piece (72); the first sliding stop piece (71) and the second sliding stop piece (72) are connected to the outer wall of the second telescopic rod (20) through a positioning structure (90); and the positioning structure (90) comprises a positioning hole (91) formed in the second telescopic rod (20) and a positioning block (92) disposed on the first sliding stop piece (71) and the second sliding stop piece (72); and the positioning block (92) is inserted into the positioning hole (91).

16. The support frame according to claim 15, wherein a first abutting portion (411) abutting against the limiting piece assembly (30) is disposed on the locking assembly (40).

17. The support frame according to claim 16, wherein external contours of cross sections of the first telescopic rod (10) and the second telescopic rod (20) are non-circular.

18. The support frame according to claim 17, wherein the snap-in piece (60) and the locking assembly (40) are molded integrally.

* * * * *